Feb. 4, 1947.    F. J. WOOD    2,415,325
FLYING CUTTING DEVICE FOR CUTTING STRIP METAL
Filed July 2, 1943    3 Sheets-Sheet 1
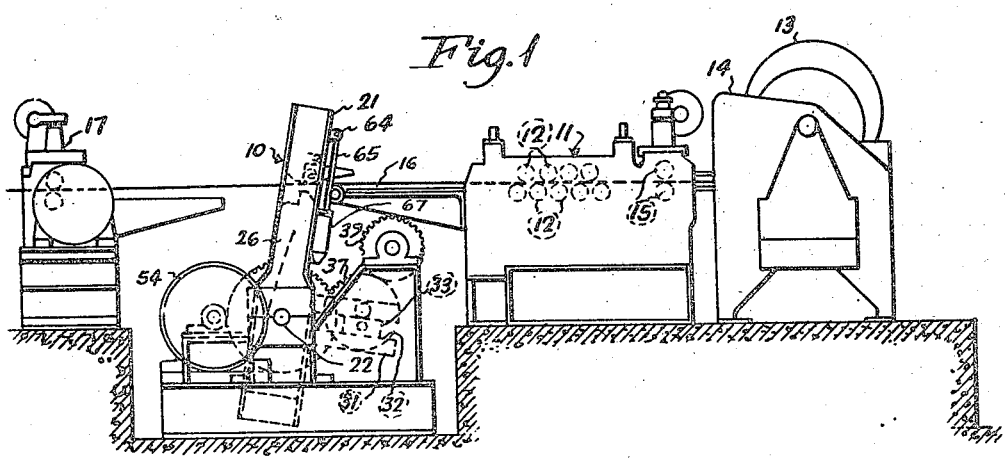
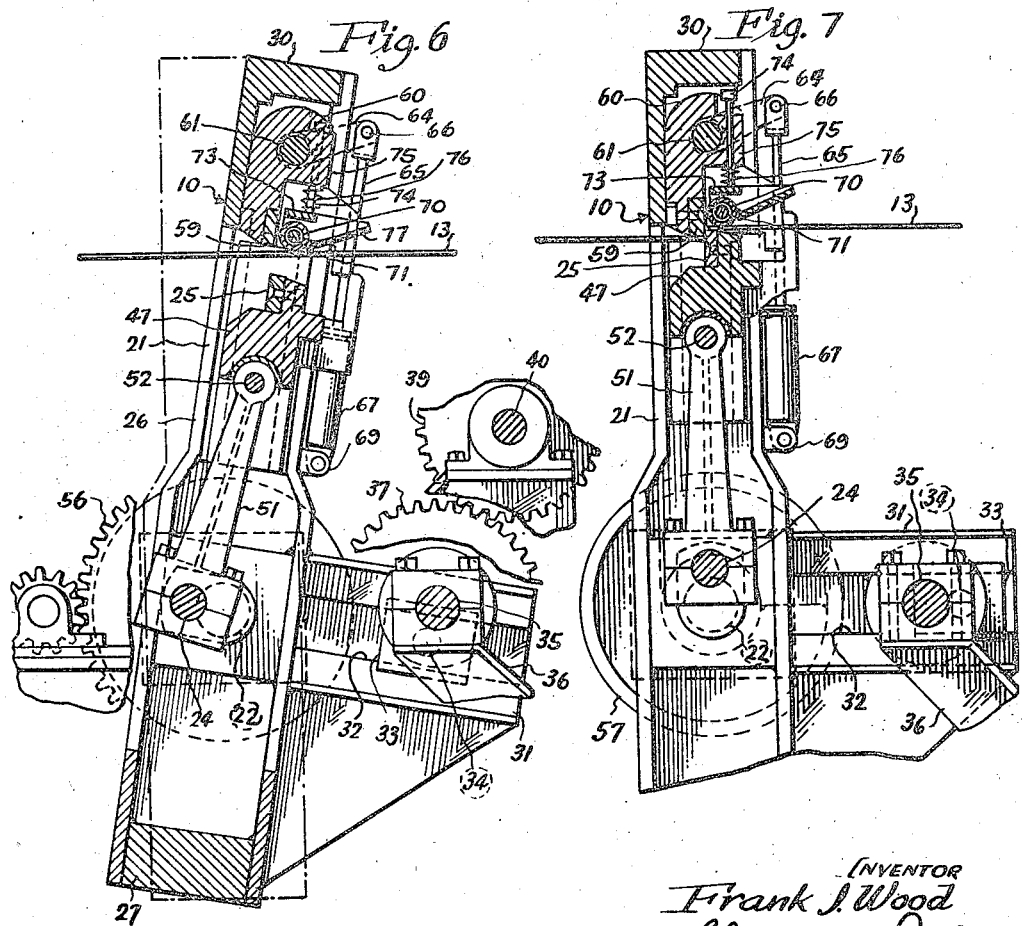
INVENTOR
Frank J. Wood
Clarence F. Poole
ATTORNEY

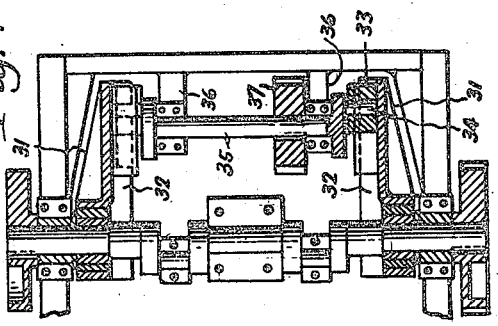
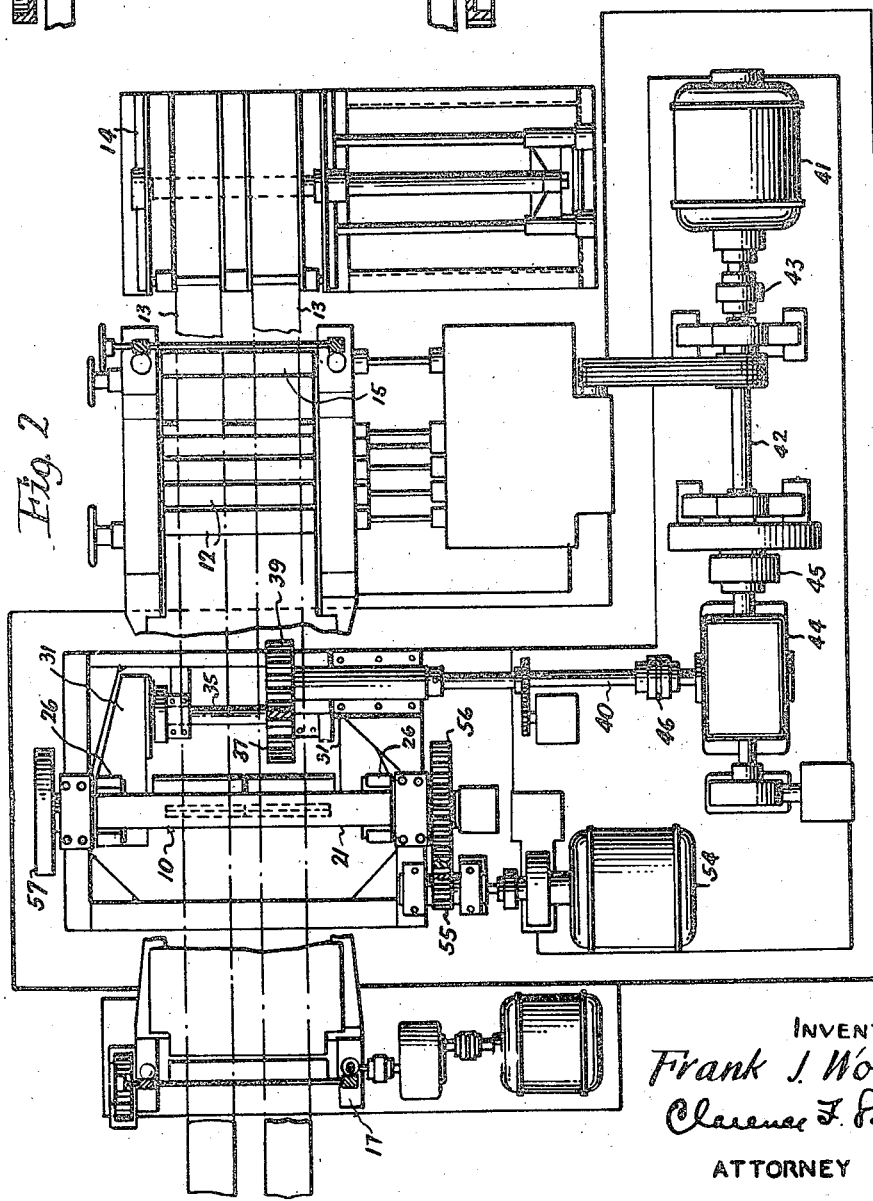

Feb. 4, 1947. F. J. WOOD 2,415,325
FLYING CUTTING DEVICE FOR CUTTING STRIP METAL
Filed July 2, 1943 3 Sheets-Sheet 3
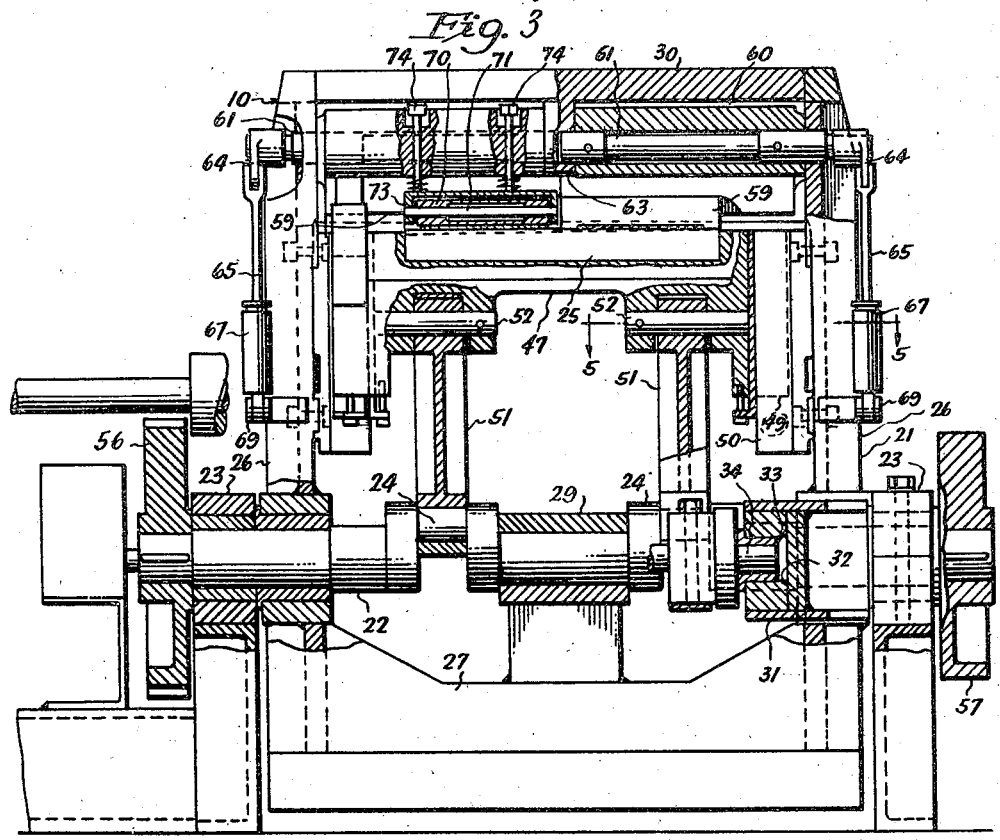
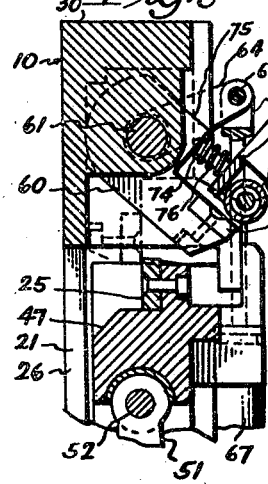
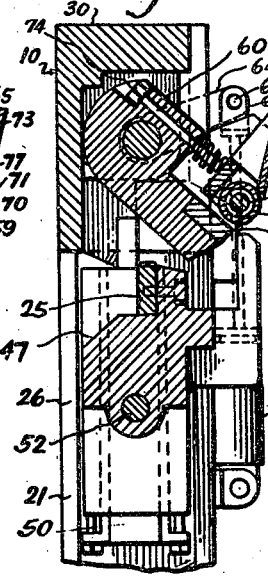
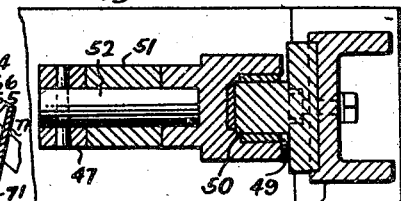
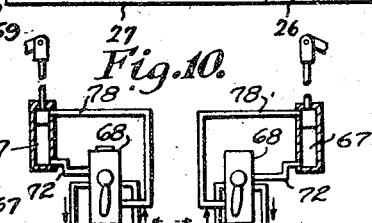
INVENTOR
Frank J Wood
BY Clarence F. Poole
ATTORNEY Patented Feb. 4, 1947

2,415,325

UNITED STATES PATENT OFFICE 2,415,325

FLYING CUTTING DEVICE FOR CUTTING STRIP METAL

Frank J. Wood, Riverside, Ill., assignor to Goodman Manufacturing Company, Chicago, Ill., a corporation of Illinois Application July 2, 1943, Serial No. 493,200

15 Claims. (Cl. 164—49)

This invention relates to improvements in flying cutting devices for cutting strip metal, bar stock, and the like while in motion.

The principal objects of my invention are to provide a novel form of flying shear so arranged as to shear a plurality of individual strips of metal passing therethrough in side by side relationship, or to shear one strip while another strip, to one side of the strip which is being sheared, passes through the shear, or to shear a single strip of a width substantially equal to the combined widths of the strips passing through the shear in side by side relationship.

A further object of my invention is to provide a shear of the type wherein the shearing blades travel with the metal during shearing, which is so arranged that shearing of the metal may be effected while the shear and metal are in motion or while the shear and metal are stationary, and which will independently shear individual strips in side by side relation.

A more specific object of my invention is to provide a flying shear of the up-cut type having a novel supporting arrangement for a pair of upper shearing knives mounted in side by side relation, including means for independently moving either of said knives out of the path of travel of the metal through the shear, and including means for engaging the metal during the shearing operation and yieldably holding the metal in engagement with the lower shearing blade during the shearing cut, to prevent the fouling of the metal on the shear blades and to facilitate the continuous passing of the metal through the shear.

Other objects of my invention will appear from time to time as the following specification proceeds and with reference to the accompanying drawings wherein:

Figure 1 is a view in side elevation of a flying shear constructed in accordance with my invention, arranged for cropping the ends of the strip metal passing from the delivery end of a leveler;

Figure 2 is an enlarged plan view of the device shown in Figure 1, with certain parts broken away;

Figure 3 is an enlarged transverse sectional view taken through the shear shown in Figures 1 and 2;

Figure 4 is a detail fragmentary horizontal sectional view showing certain details of the means for moving the shear frame with the metal, during the shearing operation;

Figure 5 is a detail sectional view taken substantially along line 5—5 of Figure 3;

Figure 6 is a fragmentary longitudinal sectional view taken through the shear, showing the position of the shear at the beginning of the shearing operation;

Figure 7 is a fragmentary detail longitudinal sectional view somewhat similar to Figure 6 but showing the shear at the completion of the shearing operation;

Figure 8 is a detail fragmentary longitudinal sectional view taken through the shear, showing one of the upper shear blades raised out of the path of travel of the metal through the shear;

Figure 9 is a view somewhat similar to Figure 8 with certain other parts shown in section than in Figure 8; and Figure 10 is a diagrammatic view showing the valves and piping connections therefrom, which control movement of the upper shear blades out of the path of travel of the metal through the shear.

In the drawings a shear 10 is shown at the delivery end of a leveler 11, for cropping the tail end of the strip as it leaves said leveler and passes to a pickling or other processing device. Said shear may, however, be used for shearing the stitched ends of the strip or for shearing the strip to length as the pickling or other processing operation is completed, if desired.

The leveler 11 includes a plurality of leveling rolls 12, 12 disposed above and below the path of travel of the metal therethrough. As herein shown, two strips of metal 13, 13 are shown as passing through the leveler in side by side relationship, and opposite sides of the metal are adapted to be engaged and reversely bent and straightened as it passes from a coil box 14. Said coil box supports the coiled strip metal in side by side relationship, for unwinding in a well known manner, so is not herein shown or described in detail. A pair of vertically spaced power driven pinch rolls 15, 15 are provided at the entering end of said leveler, for engaging opposite sides of the metal and uncoiling it and pushing it through said leveler rolls 12, 12, which are also power driven. From said leveler rolls the metal passes along a supporting platform 16, extending beyond the delivery end of said leveler, to a position adjacent the entering end of the shear 10. The metal passes from said platform through said shear, to and through a pinch roll stand 17 at the discharge end of said shear. The rolls of said pinch roll stand engage opposite sides of the metal and serve to pull the metal from said shear and to push it for further processing.

The shear 10 which embodies the novel features of my invention is herein shown as being an up-cut flying shear and includes a shear frame 21 journaled on a transversely extending shaft 22, which is journaled adjacent its opposite ends in bearing-brackets 23, 23 projecting upwardly from the base for said shear. Said transverse shaft has a pair of spaced cranks 24, 24 formed integrally therewith, which serve as a drive means for moving a lower movable shear blade 25 vertically along said shear frame into cutting engagement with the metal passing through said shear. Said shear frame is of an open formation including a pair of parallel spaced side frame members 26, 26 journaled on said shaft and projecting upwardly and downwardly therefrom. A cross frame member 27 connects the lower ends of said side frame members together. Said cross frame member has a bracket 29 projecting upwardly from the transverse center thereof, which forms a bearing support for said transverse shaft between the cranks 24, 24. The upper ends of said parallel spaced sides of said shear frame are connected together by means of a cross frame member 30. Said cross frame member is substantially of an inverted L-shaped formation in cross section, one of its legs extending across the top of said frame and its other leg extending downwardly along the side of said frame opposite from the leveler 12.

An arm 31 having a longitudinal guide 32 formed therein and herein shown as opening to the inside of said shear frame, extends from each side frame member 26 of said shear frame, in a direction towards the leveler 11. Each of said longitudinal guides has a block 33 slidably guided therein. Said blocks are journaled on the ends of cranks 34, 34, on the outer ends of a transverse shaft 35, which is journaled intermediate its ends on spaced bearing brackets 36, 36, projecting upwardly from the base for said shear frame. Said transverse shaft and cranks are driven from a spur gear 37 mounted thereon, which meshes with and is driven from a spur gear 39, on the inner end of a transverse shaft 40.

The transverse shaft 40 is driven from a motor 41 which also serves as a drive means for the leveler 11. The drive from said motor to said transverse shaft includes a longitudinal shaft 42 driven from said motor through a coupling 43. Said longitudinal shaft has driving connection with a variable speed transmission 44 through a coupling 45. Said transmission may be of a type having self locking gearing therein, to hold the shear frame 26 in any desired position, and is not herein shown or described in detail since it is no part of my present invention. Said transmission is adapted to drive the shaft 40 at a speed which will cause the shear frame to move at the speed of travel of the strip, and has drive connection with said shaft 40 through a coupling 46.

The shear blade 25 is mounted in a crosshead 47 having opposite outwardly opening channelled ends 49, 49, which are guided on bearing blocks 50, 50, mounted on the insides of the upright sides 26, 26 of the shear frame 21, and extending vertically therealong (see Figure 5). Said crosshead is moved along said bearing blocks by means of a pair of spaced connecting rods 51, 51, connected thereto by means of pivotal pins 52, 52. Said connecting rods are journaled on their lower ends on the cranks 24, 24, formed integral with the transverse shaft 22.

The transverse shaft 22 is driven from a motor 54, through a spur gear train including a pinion 55 meshing with a spur gear 56, keyed on the end of said shaft (see Figure 2). The spur gear 56 is herein shown as being in the form of a fly wheel with a portion cut away so that the mass thereof is eccentric of the center of rotation of said gear, to exert an impelling force on the crosshead 47 and shear blade 25 during the upward strokes thereof. A flywheel 57 is keyed on the opposite end of said shaft. Said fly wheel likewise has its mass formed eccentric of its center and serves the same purpose as the fly wheel formed by said spur gear 56.

The inner sides of the lower shear blades 25, 25 are adapted to register with pair of upper shear blades 59, 59, which are held stationary during the shearing operation. Said stationary shear blades are mounted in side by side relation on the lower ends of blade supporting frames 60, 60, which are pivotally mounted in said shear frame in side by side relation on aligned transverse shafts 61, 61 (see Figure 3). The inner end of each of said transverse shafts is journaled in a depending lug 63, depending from the upper cross frame member 30. The opposite end of each of said shafts is journaled in and projects beyond its respective side frame member 26 and has a lever arm 64 secured thereto, which projects from said shaft in a direction towards the leveler 11 (see Figures 1, 6 and 7). A piston rod 65 is pivotally connected to the free end of each lever arm by means of a pivotal pin 66. Said piston rod is extensible from a cylinder 67, transversely pivoted at its lower end between a pair of spaced lugs 69, 69, spaced outwardly from and projecting rearwardly of the side 26 of the shear frame 21, and herein shown as being formed integral therewith. A suitable piston (not shown) is provided within said cylinder so that when fluid under pressure is admitted to the piston rod end of said cylinder, the shear blade supporting frame 60 will be held stationary in positive engagement with the vertical leg of the cross frame member 30, and when fluid under pressure is admitted to the head end of said cylinder, said shear blade will be pivoted in an upward direction out of position to be registered with the movable shear blade 25, as it moves in an upward direction, so the strip metal will continuously pass through said shear. Since said shear blade support frames are mounted in said shear frame in side by side relationship, for independent pivotal movement with respect to each other, either frame may be raised about the axis of the respective shaft 61 at will, to permit one strip to be sheared while the other strip passes through the shear, or both frames may be locked in a lowered position, to permit the shearing of a plurality of strips at the same time.

The admission and release of fluid under pressure to or from the head or piston rod ends of the cylinders 67, 67 is controlled by means of a pair of valves 68, 68. Said valves may be of any well known form and are each connected with the head and piston rod ends of an associated cylinder 67, by pressure lines 72 and 78, respectively, to provide means for independently moving either of the upper shear blades 59, 59 out of the path of travel of the metal through the shear, and for positively holding said shear blades in a stationary operative position during the shearing operation. A fluid storage tank (not shown) is provided for the return fluid, and a suitable pump (not shown) is provided to supply fluid under pressure to said valves and cylinders.

A roller 70 is mounted on each blade supporting frame 60, for vertical yieldable movement with respect thereto. Said rollers are adapted to engage the upper surface of the metal during the shearing operation and hold the metal in engagement with the lower shear blade 25. As herein shown, each roller 70 is mounted on a transverse shaft 71, which is journaled at its ends in the depending sides of a U-frame 73. Said U-frame is mounted on the lower ends of a pair of spaced bolts 74, 74, slidably mounted in a rearwardly projecting portion 75 of said blade supporting frame. Compression springs 76, 76 encircle said bolts and are interposed between the upper side of said U-frame and the under portion of said rearwardly projecting portion of said blade supporting frame, to urge said U-frame and the roller 70 into a lowered position, to cause said roller to yieldably engage the upper surface of the metal. A deflector 77 projects rearwardly from said U-frame and is shown as being formed integrally with opposite sides thereof. Said deflector is inclined at an upwardly inclined angle from the roller 70, to deflect the leading end of the metal beneath said roller, when the metal is being pushed through said shear.

During the shearing operation, when it is desired to shear a pair of strips of metal in side by side relation, the blade supporting frames 60, 60 are pivotally moved to a position against the insides of the horizontal legs of the cross frame members 30, 30 and are held rigidly thereagainst by fluid under pressure. Power is then applied to the transverse shaft 40 through the variable speed transmission 46, to drive said shaft. The motor 54 is started at the same time, to rotatably drive the cranks 24, 24 and move the lower shear blade upwardly to register along the advance faces of the upper shear blades 59, 59, and shear the metal as it passes therethrough.

It should here be noted that during the shearing operation the rollers 70, 70 engage the upper surface of the metal and travel with the metal with the shearing frame 26, and yield upwardly when the under surface of the metal is engaged by the upper surface of the upper shear blade 25. Said rollers thus serve to hold the metal to the upper surface of the shear blade, during the shearing operation, to prevent fouling of the metal and to permit it to pass through the shear with no interruption as the blade is lowered.

When two strips of metal are passing through the shear in side by side relationship and it is desired to shear one strip of metal only, one of the blade supporting frames is pivoted upwardly about its axis of connection to the shear frame, to move its blade 59 out of registry with the movable shear blade 25, as shown in Figures 8 and 9, thus permitting the metal which is not being sheared, to pass continuously through the shear during shearing of the other strip of metal.

In shearing when the strip is not in motion, the shear frame is moved into a vertical position by the cranks 34, 34 and blocks 33, 33 engaging the guides 32, 32. Said frame is then held in said position by means of said blocks and cranks and the self-locking gearing in the variable speed transmission 46. Power is then applied to the motor 54 to move the knife 25 upwardly in the shear frame 21, to engage the underside of the metal and shear it against the stationary knife 59, as in Figure 7.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excecepting as it may be limited in the appended claims.

I claim as my invention:

1. A flying shear for strip metal including a shear frame, a shearing blade mounted in said shear frame above the path of travel of the metal through said shear and adapted to be stationary, with respect to said shear frame, during the shearing operation, a shearing blade rectilinearly movable upwardly along said frame to a position registering with said first mentioned shearing blade, for cutting the strip metal passing through said shear, a transverse pivotal mounting for said upper shear blade on said shear frame to permit said shear blade to be moved out of registry with said movable shear blade, and power means having operative connection with said upper shear blade and manually controllable to hold said shear blade in a stationary position for shearing, and to pivotally move said shear blade out of the path of travel of the metal through said shear.

2. A flying shear for strip metal including a shear frame pivoted for movement about an axis extending transversely of the material it is desired to cut and movable therewith during the shearing operation, a shearing blade mounted in said frame above the path of the material through said shear, a movable shearing blade movable upwardly along said frame to a position registering with said first mentioned shearing blade for cutting the material passing through said shear, a pivotal mounting for said first mentioned shear blade on said shear frame, to permit said shear blade to be moved out of registry with said movable shear blade, means for holding said upper shear blade stationary with respect to said shear frame during shearing or for pivoting said shear blade out of a shearing position, power means for moving said movable shear blade along said frame to effect shearing, and independent power means for pivotally moving said shear frame in the direction of and at the speed of travel of the strip through said shear, to effect shearing during continuous movement of the strip through said shear, said means being adapted to hold said shear frame in a stationary upright position, to permit shearing when the strip is not in motion.

3. A flying shear for strip metal including a shear frame pivoted for movement about an axis extending transversely of the material it is desired to cut and movable therewith during the shearing operation, a shearing blade disposed above the path of the metal through said shear and adapted to be stationary during the shearing operation, a shearing blade movable upwardly along said frame to a position registering with said first mentioned shearing blade for shearing the strip metal passing through said shear, a pivotal mounting for said upper shear blade on said shear frame to permit said shear blade to be moved out of registry with said movable shear blade, a roller in advance of said upper shear blade adapted to engage the upper surface of the metal to yieldably engage the metal with the lower shear blade during shearing, and power means having operative connection with said upper shear blade and manually controllable to hold said shear blade in a stationary position with respect to said shear frame for shearing and to pivotally move said shear blade and roller out of the path of travel of the metal through said shear.

4. A flying shear for strip metal comprising a shear frame pivoted for movement about an axis extending transversely of the material it is desired to cut and movable therewith during the shearing operation, a plurality of shear blades mounted in said frame in side by side relation and disposed above the path of travel of the strip metal through said shear, a shear blade mounted in said shear frame for vertical movement therealong, means for positively moving said movable shear blade upwardly along said frame in registry with the advance faces of said first mentioned shear blades, for shearing a plurality of strips as they pass through said shear in side by side relation, and means selectively operable for moving any of said first mentioned shear blades out of the path of travel of the strip through said shear, to permit shearing of one strip passing through said shear beside another strip, without shearing said other strip.

5. A flying shear for strip metal comprising a shear frame pivoted for movement about an axis extending transversely of the material it is desired to cut and movable therewith during the shearing operation, a plurality of shear blades mounted in said frame in side by side relation and disposed above the path of travel of the strip metal through said shear, a shear blade mounted in said shear frame for vertical movement therealong, means for positively moving said movable shear blade upwardly along said frame in registry with the advance faces of said upper shear blades, for shearing the strip as it passes therethrough, means for mounting each of said first mentioned shear blades on said shear frame for independent pivotal movement with respect thereto about a transverse axis, and manually controllable power means for holding said shear blades from movement with respect to said shear frame during the shearing operation and for selectively moving either of said shear blades about their axes of connection to said shear frame out of the path of travel of the strip through said shear, to permit shearing of one strip passing through said shear beside another strip, without shearing said other strip.

6. A flying shear for strip metal comprising a shear frame pivoted for movement about an axis extending transversely of the material it is desired to cut and movable therewith during the shearing operation, means for positively moving said shear frame with the strip about said pivotal axis during the shearing operation, a plurality of shear blades extending in side by side relation and mounted in said shear frame above the path of travel of the strip metal through said shear, a shear blade movable upwardly along said frame for registering with the advance faces of said first mentioned shear blades for shearing the strip as it passes through said shear, and means permitting the shearing of a plurality of strips passing through said shear in side by side relation, or the shearing of a single strip, while another strip beside said single strip passes through said shear including power means independently operable for moving either of said first mentioned shear blades out of the path of travel of the strip through said shear.

7. A flying shear for strip metal comprising a shear frame pivoted for movement about an axis extending transversely of the material it is desired to cut and movable therewith during the shearing operation, a plurality of shear blades extending in side by side relation and disposed above the path of travel of the strip metal through said shear, a shear blade movable upwardly along said frame for registering with the advance faces of said first mentioned shear blades and shearing the strip as it passes through said shear, and means permitting the shearing of a pair of strips in side by side relation, or the shearing of a single strip while another strip beside said single strip passes through said shear including a separate transverse pivotal mounting for each of said upper shear blades, and independently operable power means having connection with said pivotal mountings, for positively holding either of said upper shear blades from pivotal movement during shearing and for pivotally moving either of said shear blades out of the path of travel of the material through said shear.

8. A flying shear for strip metal comprising a shear frame pivoted for movement about an axis extending transversely of the material it is desired to cut and movable therewith during the shearing operation, a plurality of shear blades extending in side by side relation and disposed above the path of travel of the strip metal through said shear, a roller in advance of each of said first mentioned shear blades and adapted to engage the upper surface of the metal as it passes through said shear, a shear blade movable upwardly along said frame for registering with the advance faces of said first mentioned shear blades and shearing the strip as it passes through said shear, means permitting shearing of a plurality of strips in side by side relation or permitting the shearing of a single strip while another strip beside said single strip passes through said shear including a separate transverse pivotal mounting for each of said upper shear blades on said shear frame, independently operable power means having connection with said pivotal mountings, for positively holding each of said upper shear blades from pivotal movement during shearing and for moving either of said shear blades and rollers out of the path of travel of the material through said shear, and means for yieldably engaging said rollers with the upper surface of the metal during shearing and for holding said rollers in engagement with the metal after the shearing operation, to hold the metal in engagement with the upper surface of said movable shear blade as it passes through the shear, to facilitate the uninterrupted passage of the sheared strip through said shear.

9. A flying shear for strip metal including a shear frame, a plurality of blade supporting frames mounted in side by side relation adjacent the upper end of said shear frame for pivotal movement about coaxial transverse axes disposed adjacent the upper ends of said blade supporting frames, a shear blade mounted in the lower portion of each of said frames and adapted to remain stationary during the shearing operation, a movable shear blade vertically slidably mounted in said shear frame for shearing registry with said first mentioned shear blades, and separate power means having operative connection with each of said blade supporting frames and independently operable to swing said frames and the shear blades mounted thereon away from said movable shear blade, to move either of said first mentioned shear blades out of shearing position and to permit the uninterrupted travel of one strip through said shear during the operation of shearing of another strip passing through said shear.

10. A flying shear for strip metal including a shear frame, a pair of blade supporting frames mounted in side by side relation adjacent the upper end of said shear frame for pivotal movement about a transverse axis disposed adjacent their upper ends, a shear blade mounted in each of said blade supporting frames and adapted to remain stationary during the shearing operation, a movable shear blade slidably mounted in said shear frame for shearing registry with said stationary shear blades, power means having operative connection with said blade supporting frames and independently operable to swing said frames and the shear blades mounted thereon away from said movable blades, to render either of said stationary blades inoperative for shearing and to permit the uninterrupted travel of the strip through said shear, a transversely extending roller mounted in each of said blade supporting frames in advance of the shear blades carried thereby, and yieldable means urging said rollers into engagement with the upper surface of the strip when said blade supporting frames are in a shearing position, and to maintain said rollers in engagement with the strip during the shearing operation, to provide an uninterrupted travel of the strip through said shear.

11. A flying shear for strip metal including a shear frame, a pair of blade supporting frames mounted in side by side relation adjacent the upper end of said shear frame for pivotal movement about a transverse axis disposed adjacent the upper end of said frame, a shear blade mounted in each of said frames and adapted to remain stationary during the shearing operation, a movable shear blade vertically slidably mounted in said shear frame for shearing registry with the advance faces of said first mentioned shear blades, a lever arm projecting outwardly from each of said blade supporting frames, and a separate fluid pressure cylinder and piston having operative connection with each of said lever arms, for holding said blade supporting frames in a shearing position during the shearing operation, or for rocking either of said frames to a position to move the shear blades mounted thereon out of the path of travel of the metal through said shear, so a pair of strips may be sheared in side by side relation, or so a single strip may be sheared while another strip passes through the shear.

12. A flying shear for strip metal including a shear frame, a pair of blade supporting frames mounted in side by side relation adjacent the upper end of said shear frame for pivotal movement about coaxial transverse axes disposed adjacent their upper ends, a shear blade mounted in each of said frames and adapted to remain stationary during the shearing operation, a movable shear blade mounted in said shear frame for vertical movement therealong into shearing registry with the advance faces of said stationary shear blades, a separate lever arm projecting from each of said blade supporting frames, a separate fluid pressure cylinder and piston having operative connection with each of said lever arms, for holding said blade supporting frames in a shearing position, or for locking either of said frames in a position so the shear blades mounted thereon are out of the path of travel of the metal through said shear, so a pair of strips may be sheared in side by side relation, or so a single strip may be sheared while another strip passes through the shear, a transversely extending roller mounted in each of said blade supporting frames, and yieldable means for urging said rollers in a direction to engage the upper surface of the strip when said blade supporting frames are in a shearing position, and to maintain said rollers in engagement with the strip during the shearing operation, to provide an uninterrupted travel of the strip through said shear.

13. A flying shear for strip metal including a shear frame pivoted for movement about an axis extending transversely of the material it is desired to cut and movable therewith about said axis during the shearing operation, a shearing blade mounted in said frame and adapted to be held stationary with respect to said frame during the shearing operation, a movable shear blade movable towards and from said stationary shear blade to register with said stationary shear blade for cutting the material passing through said shear, a pivotal mounting for said stationary shear blade on said shear frame, power means for positively holding said stationary shear blade stationary with respect to said frame during the cutting operation and selectively operable to move said shear blade out of the path of travel of the metal through said shear independently of movement of said movable shear blade, power means for moving said movable shear blade along said frame to effect shearing, and independent power means for pivotally moving said shear frame in the direction of and at the speed of travel of the strip through said shear, said means being adapted to hold said shear frame in a stationary upright position, to permit shearing when the strip is not in motion.

14. A flying shear for strip metal including a shear frame pivoted for movement about an axis extending transversely of the material it is desired to cut and movable therewith about said axis during the shearing operation, a shearing blade adapted to be held stationary with respect to said shear frame during the shearing operation, a movable shearing blade movable towards said first mentioned shearing blade to a position registering with said blade, for shearing the strip metal passing through said shear, a pivotal mounting for said stationary shear blade, to permit said shear blade to be moved out of the path of travel of the metal through said shear, independently of movement of said movable shear blade, a roller in advance of said stationary shear blade and adapted to engage the metal and hold the metal in engagement with said movable shear blade when said stationary shear blade is in a shearing position, and power means having operative connection with said stationary shear blade and manually controllable to hold said shear blade in a stationary position for shearing and selectively operable to move said shear blade and roller out of the path of travel of the metal through said shear.

15. A flying shear for strip metal including a shear frame, a plurality of shear blades adapted to be held stationary with respect to said shear frame during shearing and mounted in said frame in side by side relation for pivotal movement about coaxial transverse axes, a movable shear blade movable towards and from said first mentioned shear blades for shearing registry with said first mentioned shear blades, and separate power means having operative connection with each of said stationary shear blades and independently operable to move said blades out of the path of travel of the metal through said shear independently of movement of said movable blade, to move either of said first mentioned shear blades out of shearing position and to permit the uninterrupted travel of one strip through said shear during the operation of shearing another strip passing through said shear.

FRANK J. WOOD.

REFERENCES CITED

The following references are of record in the file of this patent:

UNITED STATES PATENTS

| Number | Name | Date |
| --- | --- | --- |
| 773,561 | George | Nov. 1, 1904 |
| 1,969,433 | Smithmans | Aug. 7, 1934 |
| 1,973,515 | Talbot | Sept. 11, 1934 |
| 2,351,868 | Morgan | June 20, 1944 |